(12) United States Patent
Pfister

(10) Patent No.: US 6,446,313 B2
(45) Date of Patent: Sep. 10, 2002

(54) MECHANICAL LOCKING CONNECTOR

(76) Inventor: Joel W. Pfister, 4967 Kensington Gate, Shorewood, MN (US) 55331

(*) Notice: Subject to any disclaimer, the term of this patent is extended or adjusted under 35 U.S.C. 154(b) by 0 days.

(21) Appl. No.: 09/773,215

(22) Filed: Jan. 31, 2001

Related U.S. Application Data

(60) Continuation-in-part of application No. 09/736,778, filed on Dec. 14, 2000, now Pat. No. 6,286,192, which is a division of application No. 09/398,970, filed on Sep. 17, 1999, now Pat. No. 6,161,262, which is a division of application No. 09/276,879, filed on Mar. 26, 1999, now Pat. No. 6,119,317.

(51) Int. Cl.$^7$ .................................................. F16B 2/04
(52) U.S. Cl. ........................ 24/514; 411/60.2; 24/569; 403/374.4
(58) Field of Search .......................... 24/514, 568, 569; 312/140; 411/60.2, 60.3, 77, 61, 63–65, 57.1; 248/223.41, 297; 403/297, 314, 374.3

(56) References Cited

U.S. PATENT DOCUMENTS

| | | | | |
|---|---|---|---|---|
| 614,944 A | * | 11/1898 | Gaylor | 411/60.2 X |
| 3,908,977 A | * | 9/1975 | Roepke et al. | 411/44 X |
| 5,273,382 A | * | 12/1993 | Yearick | 411/64 |
| 5,556,218 A | * | 9/1996 | Homer | 403/370 X |
| 5,931,599 A | * | 8/1999 | Kuenzi | 403/374.4 |

\* cited by examiner

Primary Examiner—Robert J. Sandy
(74) Attorney, Agent, or Firm—Hugh D. Jaeger

(57) ABSTRACT

A mechanical locking connector having a wedge, a wedge receiver, and an actuator. A wedge aligns closely to the interior of a wedge receiver and is forced by an actuator to expand opposing sides of the wedge receiver outwardly to frictionally engage any suitably shaped receptor having two corresponding opposing engageable sides.

18 Claims, 13 Drawing Sheets

MECHANICAL LOCKING CONNECTOR

CROSS REFERENCES TO CO-PENDING APPLICATIONS

This patent application is a continuation-in-part of Ser. No. 09/736,778 entitled "Clamp Assembly" filed on Dec. 14, 2000, U.S. Pat. No. 6,286,192 which is a division of Ser. No. 09/398,970 entitled "Clamp Assembly" filed on Sep. 17, 1999, U.S. Pat. No. 6,161,262, which is a division of Ser. No. 09/276,879 entitled "Clamp Assembly" filed on Mar. 26, 1999, U.S. Pat. No. 6,119,317.

BACKGROUND OF THE INVENTION

1. Field of the Invention

The present invention is for a mechanical locking connector, and more specifically is for a mechanical locking connector having a wedge, a wedge receiver, and an actuator machine screw. Planar panels of the mechanical locking connector are actuated to engage a suitably shaped receptor.

2. Description of the Prior Art

None.

SUMMARY OF THE INVENTION

The general purpose of the present invention is to provide a mechanical locking connector, and more particularly, to provide a mechanical locking connector which expands within and which frictionally engages any suitably shaped receptor having two or more opposing sides. Each mechanical locking connector can also secure to such objects having a suitably shaped receptor or other devices, such as configured tubes, to form other usable structures, the examples of which could be table legs, shelf bracing, shelving legs, strut bracing, support systems and the like, or can even be utilized to connect two configured tubes in end-to-end fashion. The mechanical locking connector can also attach to other objects such as, but not limited to, rollers, casters, plugs or other items which locate at one end of an object having a suitably constructed receptor. The major components of the mechanical locking connector include a wedge, a wedge receiver, and an actuator in the form of a machine screw extending through a body hole in the wedge receiver to threadingly engage the wedge. To accomplish a locking action, the mechanical locking connector is aligned within one end of a suitably shaped receptor and the actuator machine screw is rotated to draw the wedge into the wedge receiver to bear against and cause opposing walls of the wedge receiver to flex outwardly to bear against and to frictionally engage at least two opposing interior planar panels or sides of the suitably shaped receptor.

According to one embodiment of the present invention, there is provided a mechanical locking connector. The mechanical locking connector includes a wedge and a one-piece wedge receiver each of which mutually accommodates each other in the form of complementary construction. The one-piece wedge receiver includes a top member extending between the upper regions of opposing and relatively thin and flexible planar panels which include inwardly tapering surfaces at their lower edges. Horizontally extending keeper tabs extend along inwardly facing surf aces of the planar panels. The wedge includes a central body having at its uppermost region keeper bars and opposing angled surfaces extending outwardly and downwardly from the mid-section of the central body.

One significant aspect and feature of the present invention is a mechanical locking connector having a wedge, a wedge receiver, and an actuator machine screw.

Another significant aspect and feature of the present invention is a wedge receiver having a planar top and opposing planar panels extending at an angle, preferably a right angle, and downwardly therefrom.

Still another significant aspect and feature of the present invention is a wedge which is accommodated by the wedge receiver where the wedge is actuated by an actuator machine screw to forcibly engage and cause opposing planar panels to flex outwardly to engage a suitably shaped receptor having two or more corresponding engageable and opposing sides.

Yet another significant aspect and feature of the present invention is a mechanical locking connector which can be incorporated for connection to one or more objects such as, but not limited to, a configured tube, a table top or shelf, or a caster, or which can even be incorporated to connect two configured tubes together in end-to-end fashion.

Having thus described an embodiment of the present invention and mentioned significant aspects and features thereof, it is the principal object of the present invention to provide a mechanical locking connector.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
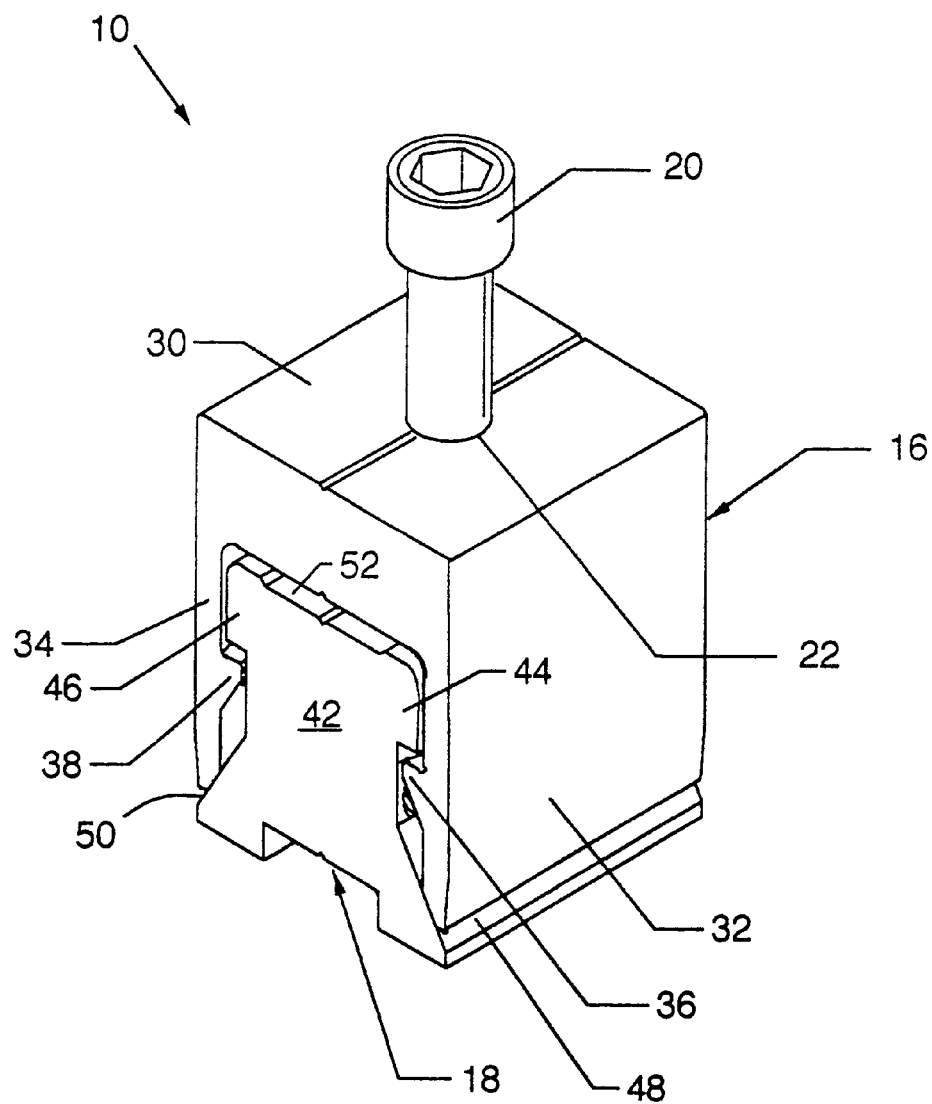
FIG. 1 illustrates an isometric view of the mechanical locking connector, the present invention.

FIG. 1 illustrates an isometric view of the mechanical locking connector 10, the present invention. Visible components shown and included in the illustration of the mechanical locking connector 10 include a one-piece wedge receiver 16, a wedge 18 which is accommodated by the wedge receiver 16, and an actuator machine screw 20 extending through a body hole 22 in the wedge receiver 16 to threadingly engage the wedge 18.

Figure 2:
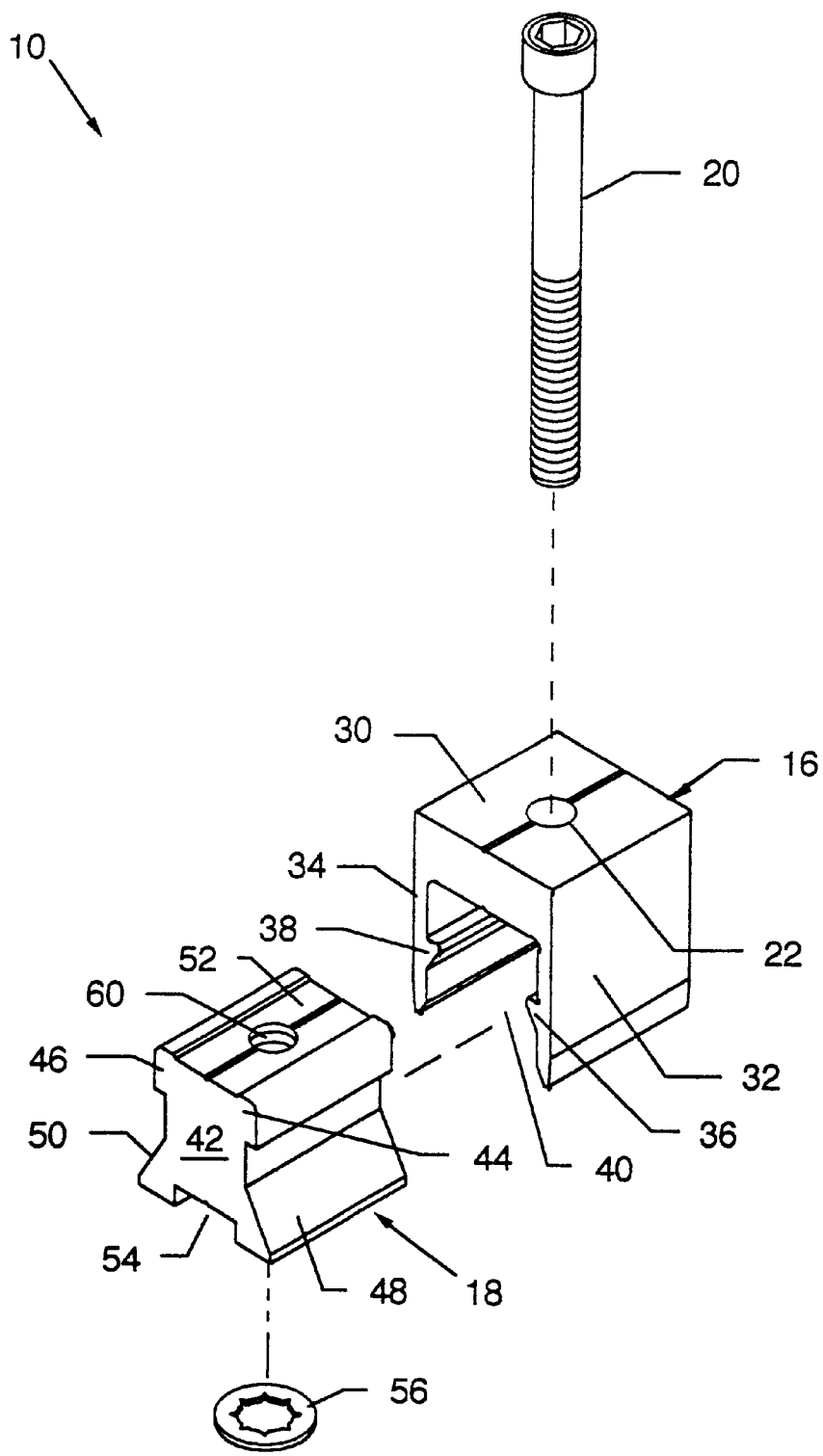
FIG. 2 illustrates an exploded isometric view of the mechanical locking connector.
Figure 3:
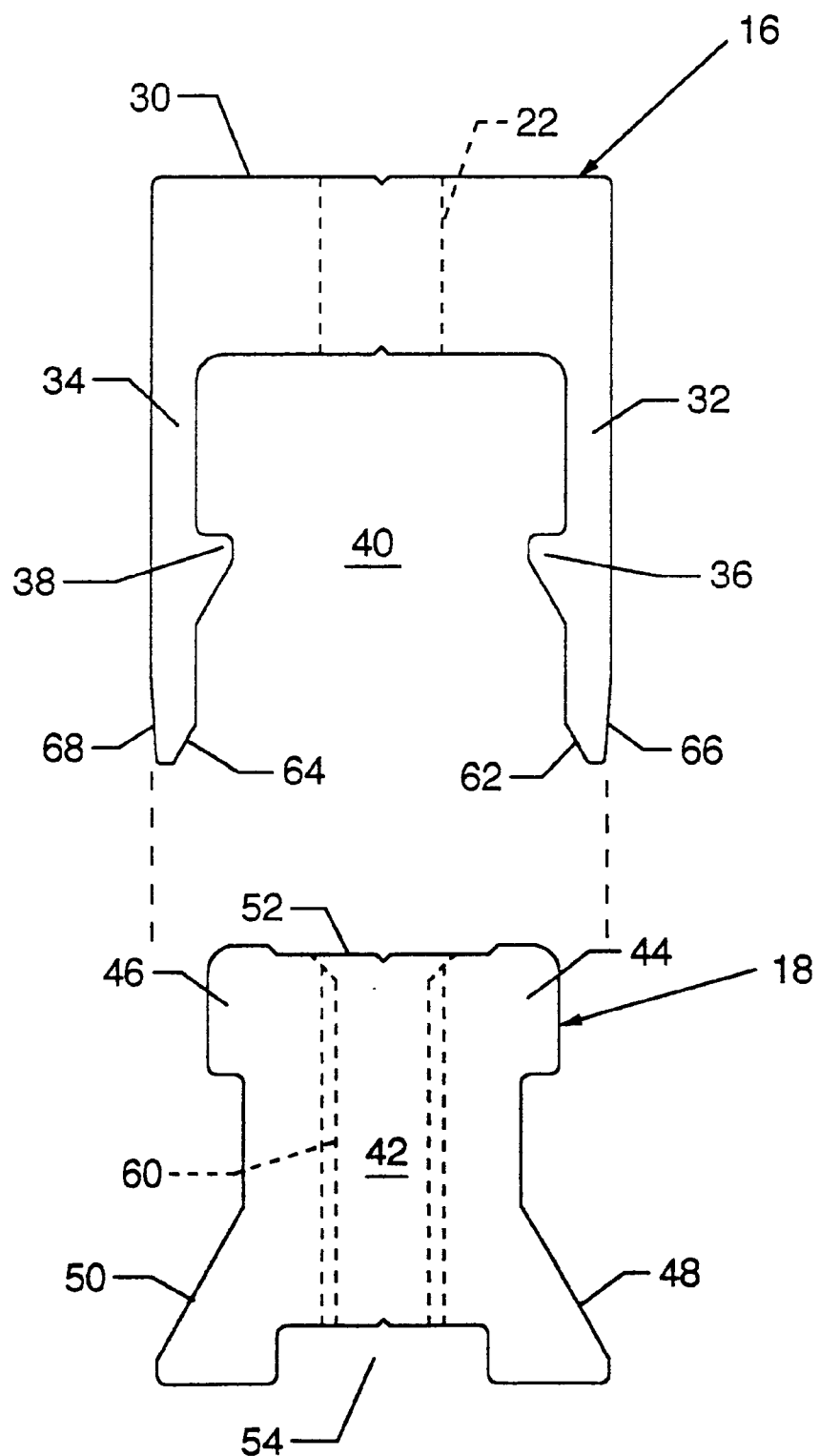
FIG. 3 illustrates an exploded view of the wedge receiver and the wedge.

FIG. 2 illustrates an exploded isometric view of the mechanical locking connector 10. The one-piece wedge receiver 16 includes a planar top 30 having a body hole 22 extending vertically therethrough. Opposing relatively thin and flexible planar panels 32 and 34 extend downwardly from the outer regions of the planar top 30. The planar panels 32 and 34 include inwardly and outwardly facing tapered surfaces as best shown in FIG. 3. Horizontally oriented and inwardly facing opposed keeper tabs 36 and 38 extend along the inwardly facing surfaces of the planar panels 32 and 34 to engage the wedge 18 to assist in keeping the wedge receiver 16 and the wedge 18 together should the actuator machine screw disengage the wedge 18. A channel 40 for accommodation of the wedge 18 is formed by the inwardly facing surface of the planar top 30 and the inwardly facing surfaces of the planar panels 32 and 34 including the keeper tabs 36 and 38. The wedge 18 includes a central body 42 having opposing keeper bars 44 and 46 extending horizontally along the top region thereof. The keeper bars 44 and 46 also extend slightly above the central body 42 to form a shallow channel 52. opposing wedge-like angled surfaces 48 and 50 extend downwardly and outwardly from the midsection of the central body 42 of the wedge 18. A channel 54 is located between the bottom surface of the central body 42 and the lower regions of the structure forming the angled surfaces 48 and 50 to accommodate a retainer 56 or other such suitable fastening structure. A threaded hole 60, which threadingly accommodates the actuator machine screw 20, extends vertically through the central body 42 to align with the body hole 22 in the wedge receiver 16. The actuator machine screw 20 extends through the body hole 22 of the wedge receiver 16 and through the threaded hole 60 of the wedge 18 to threadingly engage the retainer 56.

FIG. 3 illustrates an exploded view of the wedge receiver 16 and the wedge 18. Illustrated in particular are the inwardly facing angled surfaces 62 and 64 located on the lower and inwardly facing surfaces of the planar panels 32 and 34, respectively, of the wedge receiver 16 which intimately and slidingly contact the angled surfaces 48 and 50 of the wedge 18. Outwardly facing tapered surfaces 66 and 68 are located on the lower and outwardly facing surfaces of the planar panels 32 and 34 to serve as interface contact areas with the interior planar regions of a suitably shaped receptor.

Figure 4:
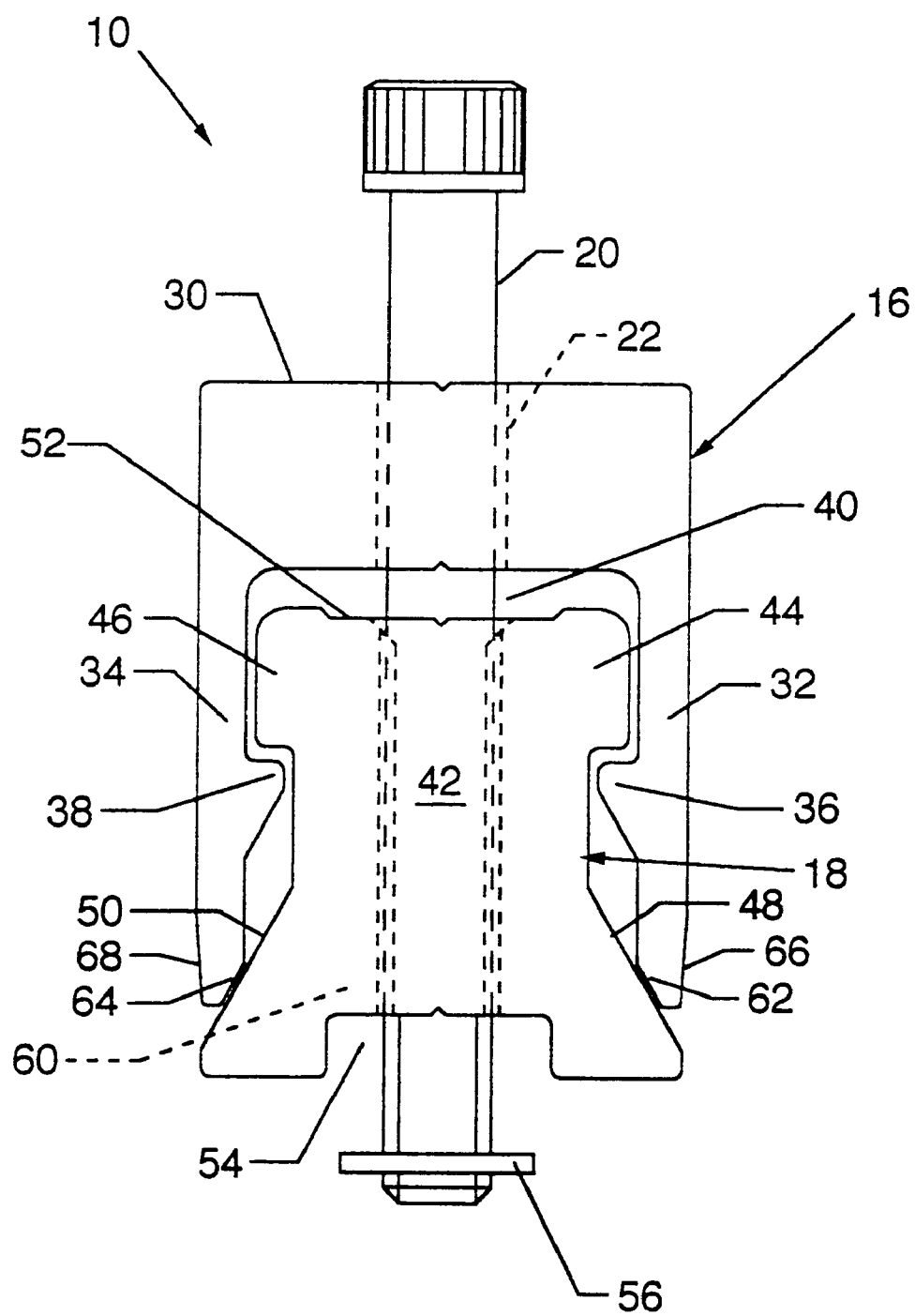
FIG. 4 illustrates an end view of the assembled mechanical locking connector.

FIG. 4 illustrates an end view of the assembled mechanical locking connector 10, where all numerals correspond to those elements previously described.

Figure 5:
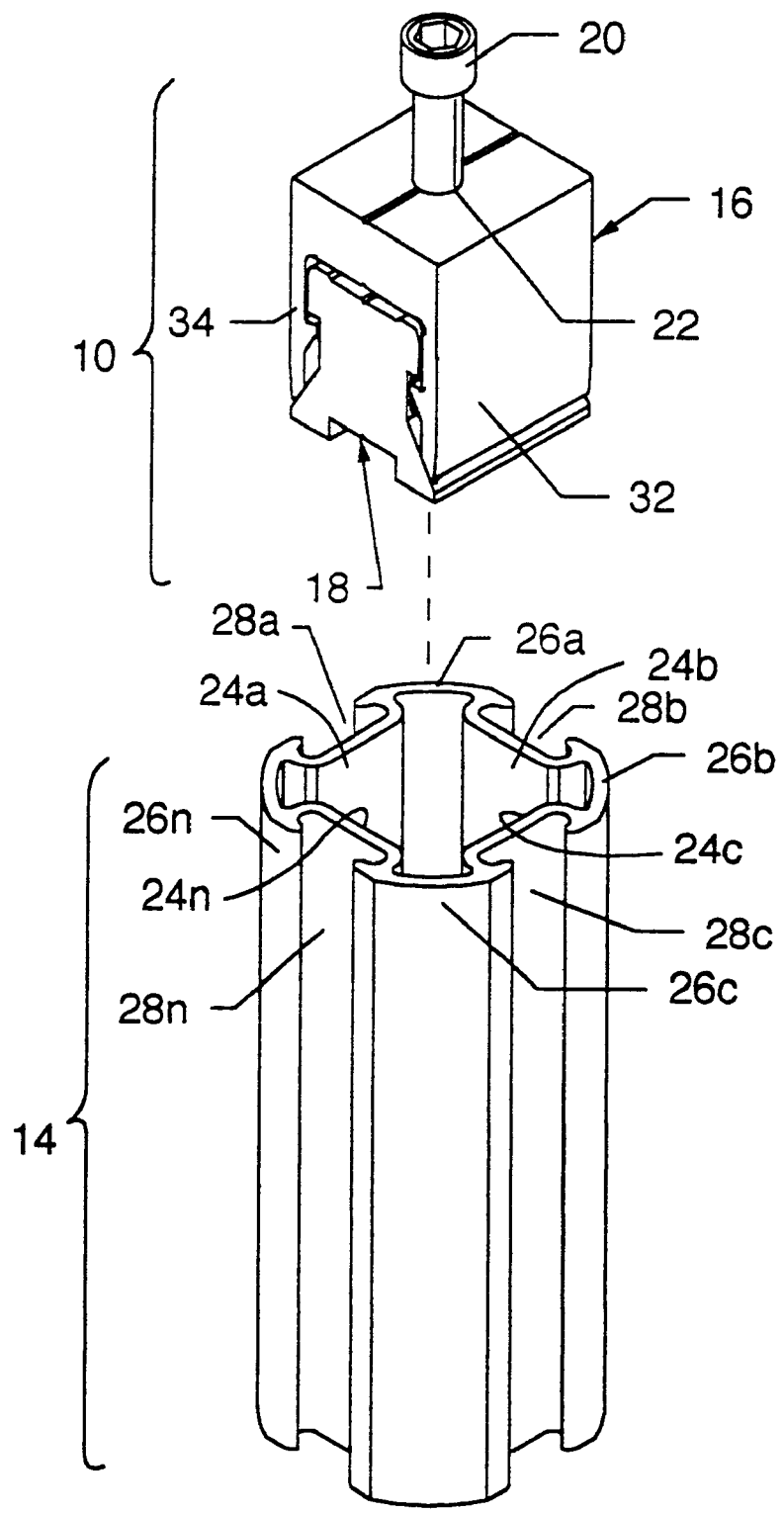
FIG. 5 illustrates a view of the mechanical locking connector prior to being inserted into and prior to frictionally engaging a suitably shaped receptor having two or more opposing sides.

FIG. 5 illustrates a view of the mechanical locking connector 10 prior to being inserted into and prior to frictionally engaging a suitably shaped receptor having two or more opposing sides. Such a suitably shaped receptor is represented by an extruded configured tube 14 for the purpose of illustration and demonstration. The extruded configured tube 14 includes centrally located structure to accommodatingly accept the mechanical locking connector 10 and slot structure to accommodate other devices which attach to the exterior of the configured tube 14. The configured tube 14 includes multiple opposed interior planar panels arranged to closely accommodate the substantially square profile of the mechanical locking connector. The centrally located structure of the configured tube 14 includes a plurality of interior planar sides 24a–24n which alternatingly intersect curved panels 26a–26n to form vertically oriented slots 28a–28n extending along the length of the configured tube 14 which are incorporated for connection of other devices thereto.

MODE OF OPERATION

Figure 6:
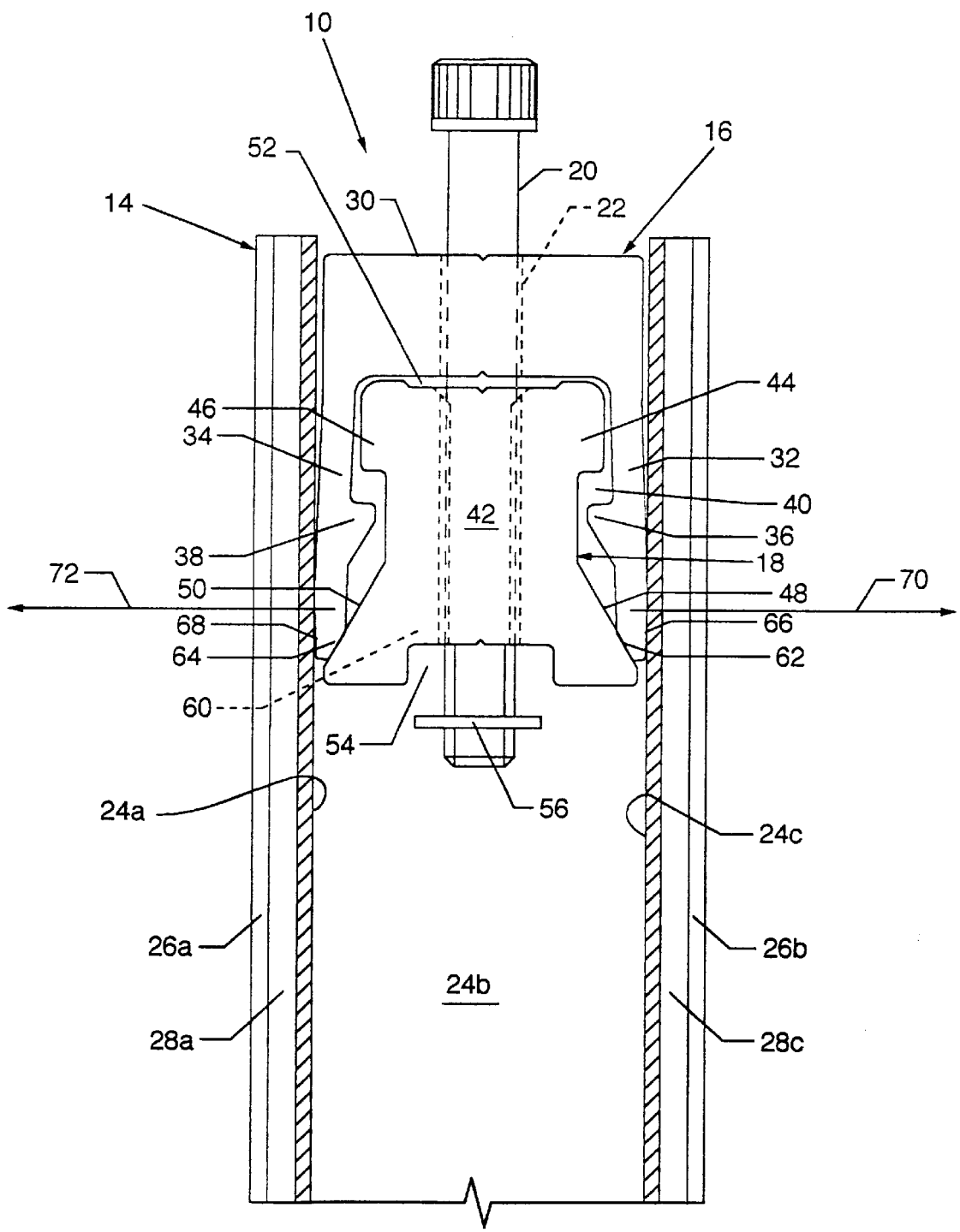
FIG. 6 illustrates in partial cutaway the mode of operation of the mechanical locking connector.

FIG. 6 illustrates in partial cutaway the mode of operation of the mechanical locking connector 10. Locking the mechanical locking connector 10 into a suitably shaped receptor represented by the configured tube 14 is accomplished by inserting an un-actuated mechanical locking connector 10 an appropriate distance into an open end of the configured tube 14. The actuator machine screw 20 is then rotated to cause the wedge 18 and the wedge receiver 16 to be drawn together whereby the wedge 18 is drawn toward the planar top 30 of the wedge receiver 16 and the angled surfaces 48 and 50 of the wedge 18 are brought into intimate and forced contact with the angled surfaces 62 and 64 of the wedge receiver 16. Such intimate and forced contact by the advancing angled surfaces 48 and 50 of the wedge 18 with the angled surfaces 62 and 64 of the wedge receiver 16 causes forceful displacement of the planar panels 32 and 34 of the wedge receiver outwardly 16, as indicated by arrows 70 and 72, into forced and intimate contact and frictional engagement with the opposing interior planar sides 24c and 24a of the configured tube 14, thereby connecting and securing the mechanical locking connector 10 to the configured tube 14. Disconnection of the mechanical locking connector 10 from the configured tube 14 is accomplished by turning the actuator machine screw 20 in the reverse direction to relax the outward forces of the mechanical locking connector 10 acting upon the configured tube 14. It is to be noted that the actuator machine screw 20 can extend as illustrated beyond the wedge receiver 16 to allow an exposed portion of the actuator machine screw 20 to be utilized to anchor another object to the mechanical locking connector 10, as shown later in detail.

Figure 7:
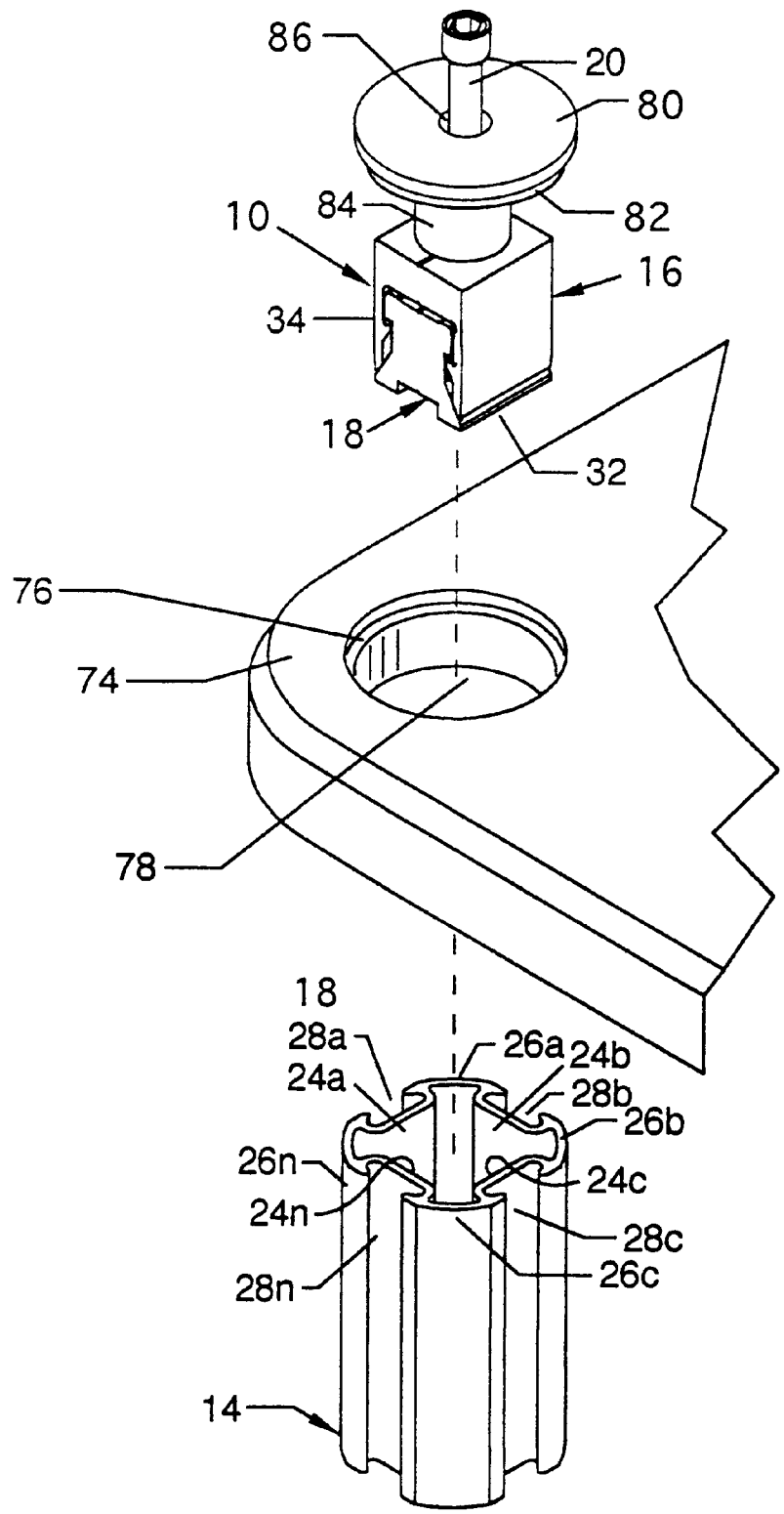
FIGS. 7 and 8 illustrate an exploded view and an assembled view, respectively, showing the use of the mechanical locking connector with a suitably shaped receptor, a configured tube, to secure the configured tube to an object such as a shelf or table.
Figure 8:
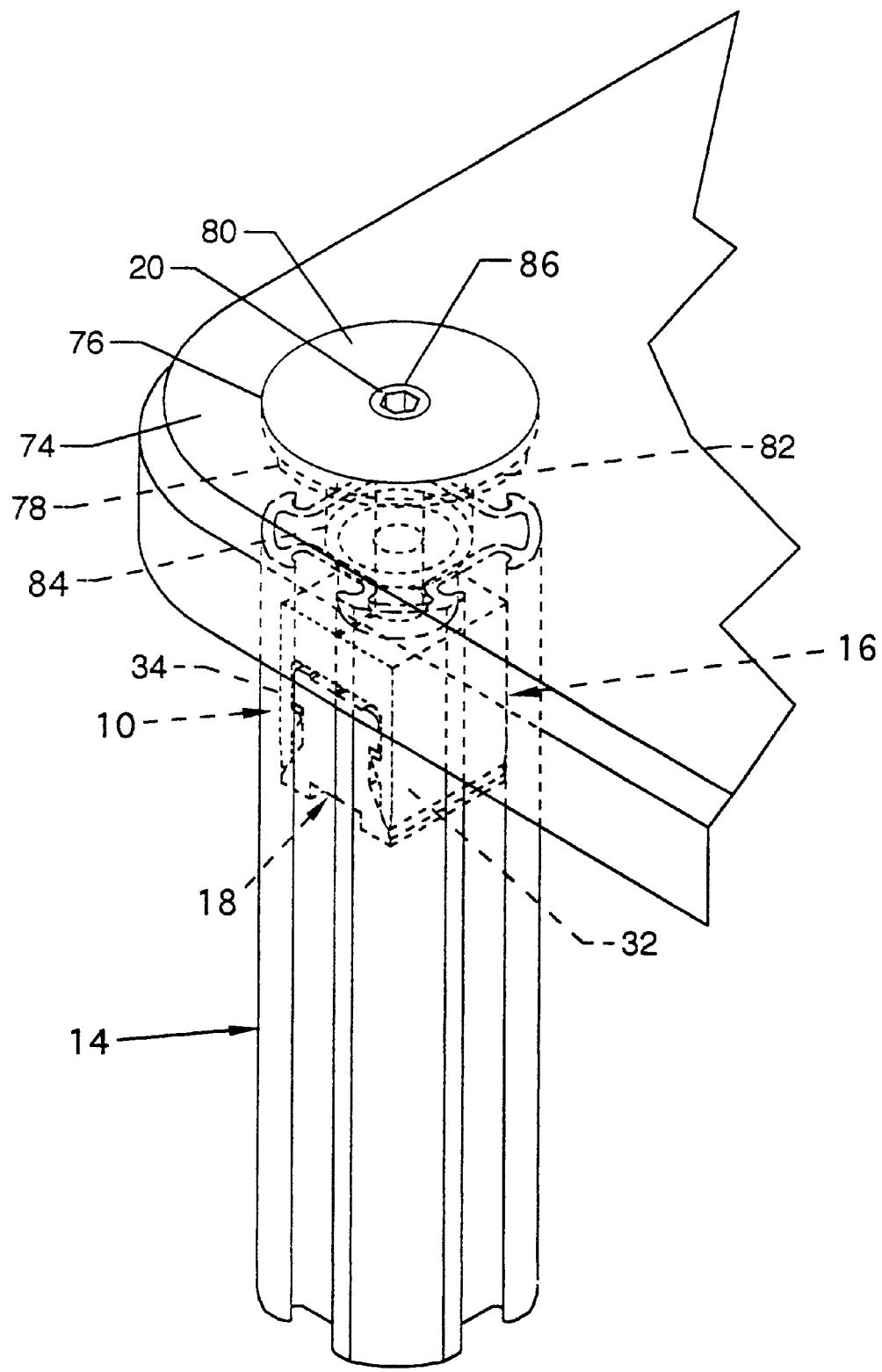

FIGS. 7 and 8 illustrate an exploded view and an assembled view, respectively, showing the use of the mechanical locking connector 10 with a suitably shaped receptor, a configured tube 14, to secure the configured tube 14 to an object such as a shelf or table 74. The shelf or table 74 includes a circular recess 76, and a bore 78 extending through the shelf or table 74 as well as concentrically extending through the circular recess 76. A disk 80 having a downwardly extending disk extension 82 is provided which can align to and which is accommodated by the circular recess 76 and bore 78. An optional spacer washer 84 aligns between the disk extension 82 and the top of the mechanical locking connector 10. The mechanical locking connector 10 can be utilized to connect a configured tube 14 to the shelf or table 14 several ways. In one method, the configured tube 14 is positioned against the underside of the shelf or table 74. The mechanical locking connector 10, including the disk 80 and optional spacer washer 84, can then be inserted through the bore 78 to cause the mechanical locking connector 10 to engage the top portion of the configured tube 14. Another method would be to insert the mechanical locking connector 10 and connected disk 80 and optional spacer washer 84 into full accommodation of the disk 80 and disk extension 82 by the bore 78 and recess 76, thereby causing the mechanical locking connector 10 to be projecting below the bottom surface of the shelf or table 74, whereby the configured tube 14 can be positioned over and about the mechanical locking connector 10. In either method, the actuator machine screw 20 is then actuated, as previously described, to secure the disk 80 into the recess 76 and the bore 78, while at the same time causing the planar panels 32 and 34 to expand against the suitable interior planar sides 24a–24n of the configured tube 14 to firmly attach the configured tube 14 to the shelf or table 74.

Figure 9:
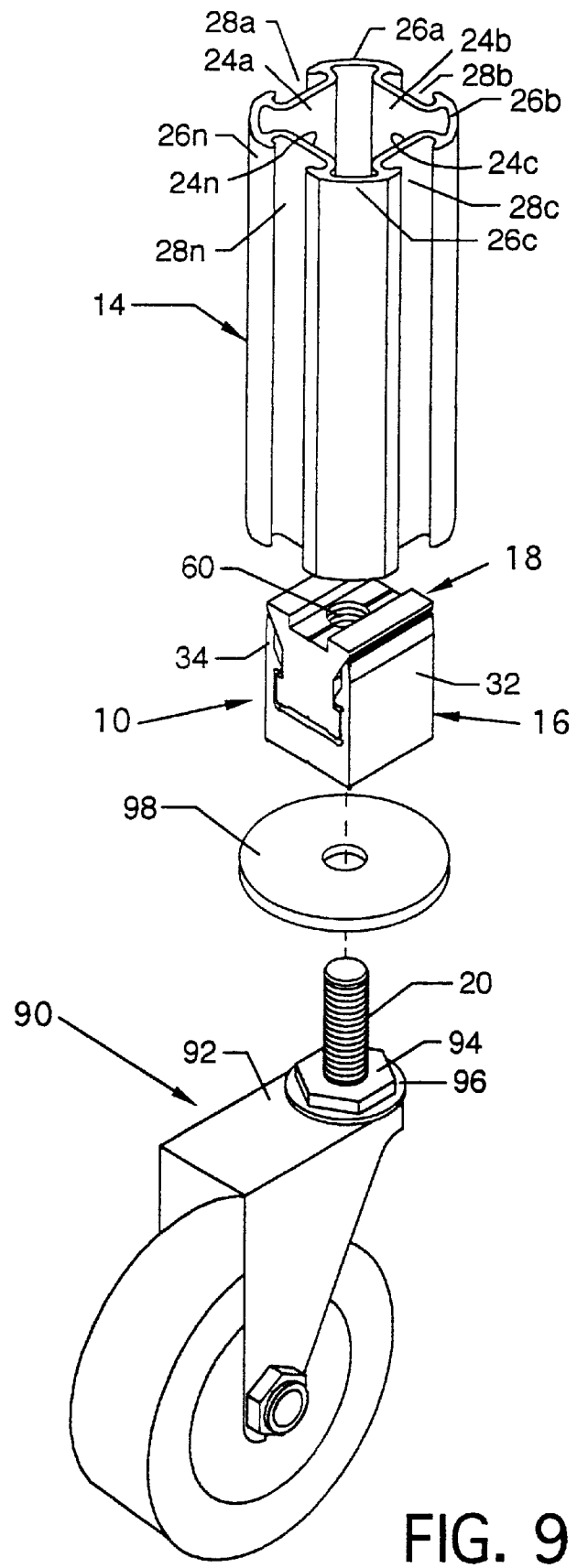
FIGS. 9 and 10 illustrate an exploded view and an assembled view, respectively, showing the use of the mechanical locking connector to connect a suitably shaped receptor, a configured tube, to a caster.
Figure 10:
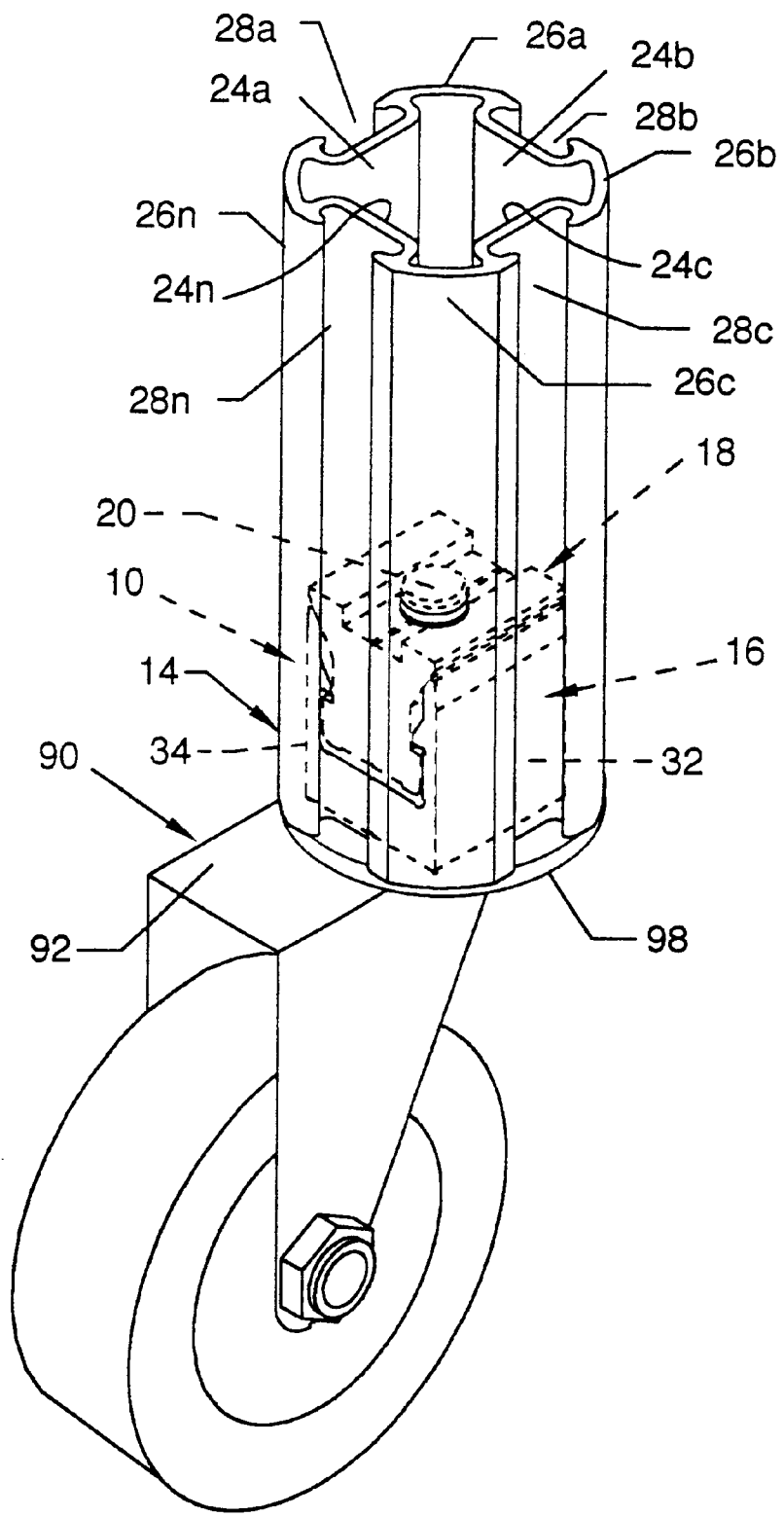

FIGS. 9 and 10 illustrate an exploded view and an assembled view, respectively, showing the use of the mechanical locking connector 10 to connect a suitably shaped receptor, a configured tube 14, to a caster 90. The mechanical locking connector 10 is inverted to accommodate the configured tube 14. The caster 90 includes a bracket 92, and the actuator machine screw 20 passes through the bracket 92 and is secured thereto in stationary fashion by a nut 94 and a washer 96. A large interfacing washer 98 aligns over the actuator machine screw 20 between the nut 94 and the mechanical locking connector 10, whereby the components are fully assembled as shown in FIG. 10. The configured tube 14, the last item to be positioned in place, is then rotated to actuate the mechanical locking connector 10, as previously described, causing frictional engagement of the mechanical locking connector 10 with the configured tube 14 to cause suitable connection of the caster 90 to the configured tube 14 via the intermediate mechanical locking connector 10. Such rotation of the configured tube 14 to rotate the mechanical locking connector 10 about the stationary actuator machine screw 20 has the same net effect as rotating the actuator machine screw 20 to tighten or loosen the mechanical locking connector 10 and as such shall not be considered to be limiting to the scope of the invention.

Figure 11:
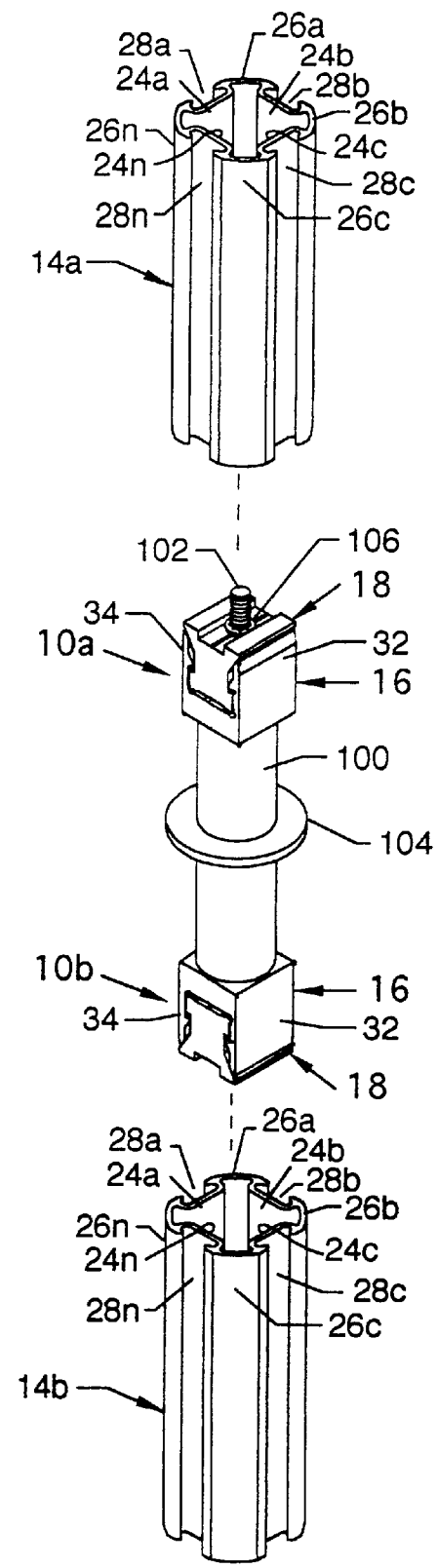
FIGS. 11 and 12 illustrate an exploded view and an assembled view, respectively, showing the use of mechanical locking connectors to connect suitably shaped receptors, such as upper and lower configured tubes; and, FIG. 13 illustrates the use of the members of FIGS. 11 and 12 where locking connectors are used to connect suitably shaped receptors, such as upper and lower configured tubes, to opposing sides of a shelf or table.
Figure 12:
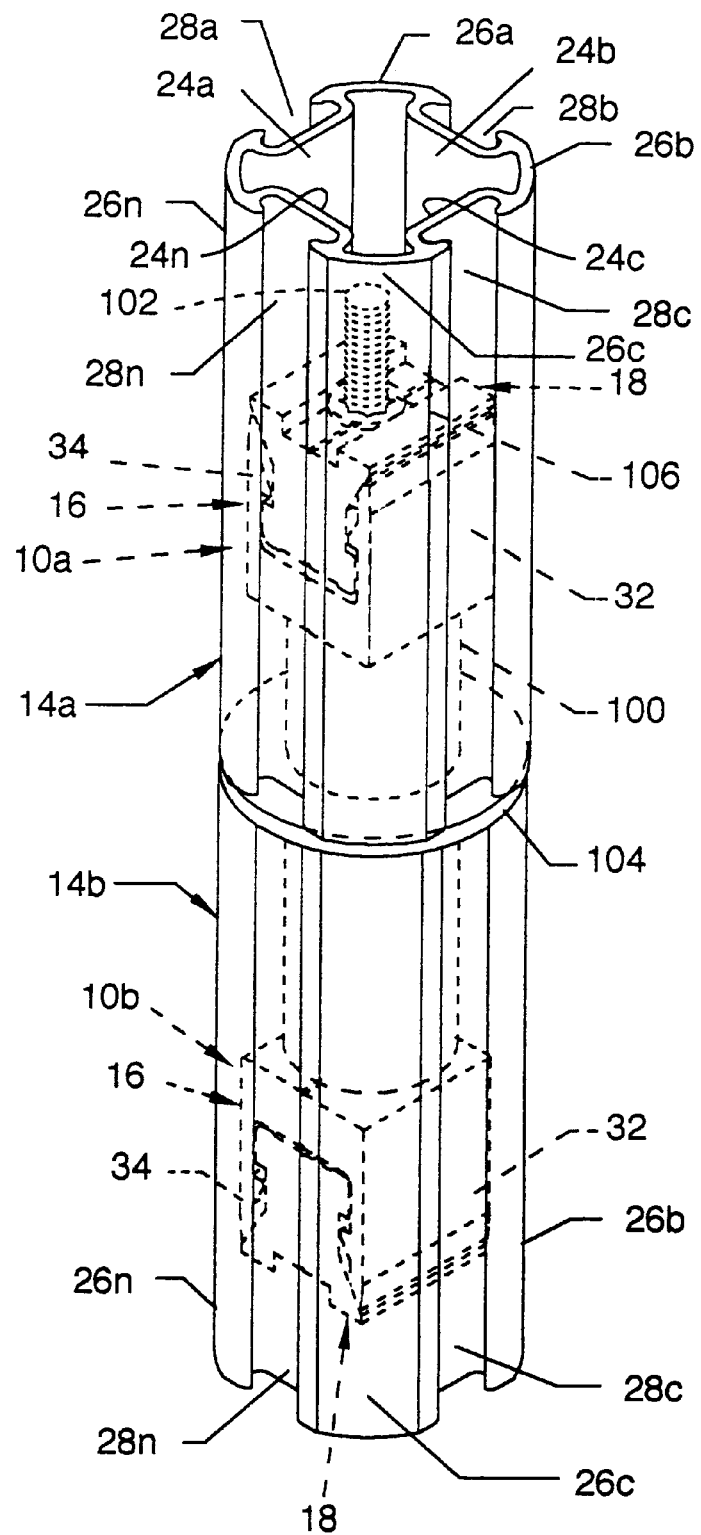

FIGS. 11 and 12 illustrate an exploded view and an assembled view, respectively, showing the use of mechanical locking connectors 10, herein designated as upper and lower mechanical locking connectors 10a and 10b, respectively, to connect suitably shaped receptors, such as upper and lower configured tubes 14a and 14b, respectively, to each other. Upper and lower mechanical locking connectors 10a and 10b are mounted in mirrored fashion at opposite ends of a central tube 100. A threaded rod 102, which is substituted for actuator machine screws 20, threadingly aligns with and engages each wedge 18 of the upper and lower mechanical locking connectors 10a and 10b to extend through each of the mechanical locking connectors 10a and 10b as well as through the center of the central tube 100. A large stabilizing washer 104 secures appropriately about the mid-section of the central tube 100. A retainer 106 threadingly engages the top portion of the threaded rod 102, and correspondingly a retainer (not shown) threadingly engages the bottom portion of the threaded rod 102 adjoining the mechanical locking connector 10b. Use of the invention is accomplished by the following example where the upper configured tube 14a is positioned over and about the upper mechanical locking connector 10a to the extent that the lower edge of the upper configured tube 14a butts against the stabilizing washer 104. The upper configured tube 14a is then rotated to cause frictional engagement of the upper mechanical locking connector 10a with the upper configured tube 14a. The lower configured tube 14b is positioned and tightened in a similar fashion over and about the lower mechanical locking connector 10b. As well as being positioned one at a time, both the upper and lower configured tubes 14a and 14b can be positioned and both turned simultaneously to cause suitable frictional engagement with both the mechanical locking connectors 10a and 10b to connect suitably shaped receptors 14, such as upper and lower configured tubes 14a and 14b, respectively, to each other via the common central tube 100.

Figure 13:
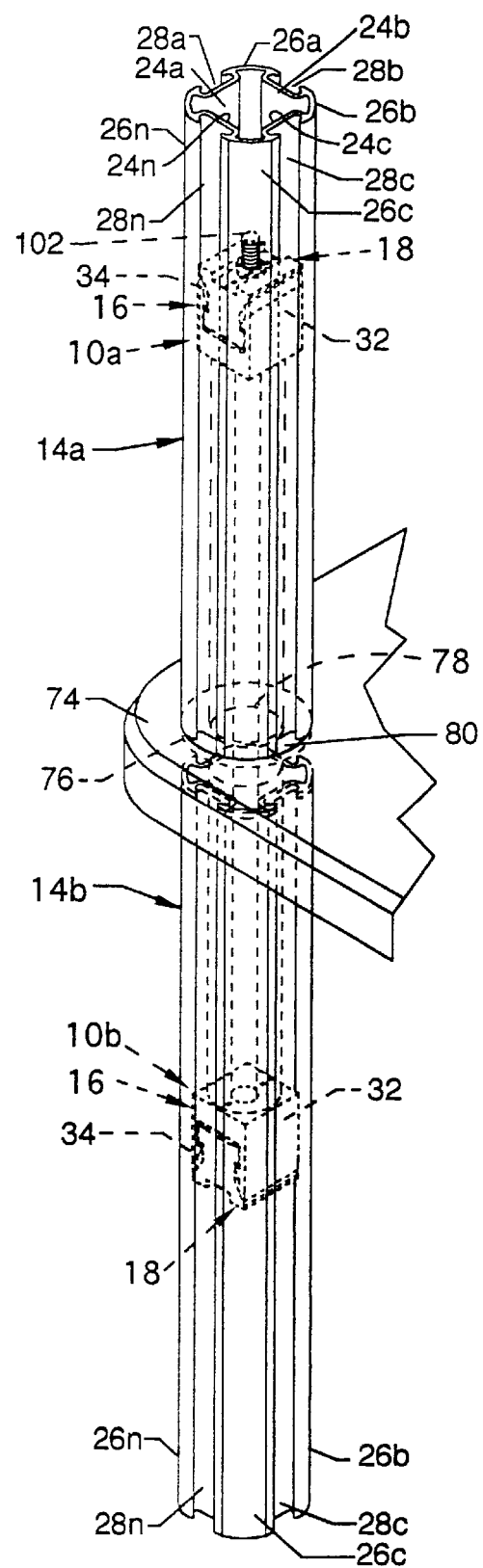

FIG. 13 illustrates the use of the members of FIGS. 11 and 12 where locking connectors 10 designated as upper and lower mechanical locking connectors 10a and 10b, respectively, are used to connect suitably shaped receptors 14, such as upper and lower configured tubes 14a and 14b, respectively, to opposing sides of a shelf or table 74, described in reference to FIG. 7. In addition, the disk 80 can also be incorporated in alignment with the recess 76 in the shelf or table 74 to provide for alignment of the upper and lower configured tubes 14a and 14b with the bore 78. The upper and lower mechanical locking connectors 10a and 10b are brought into frictional engagement with the upper and lower configured tubes 14a and 14b in the manner described in reference to FIGS. 11 and 12. The previously shown illustrations show some instances of the use of the invention and as such shall not be construed to limit the invention to just those uses described herein.

Various modifications can be made to the present invention without departing from the apparent scope hereof.

MECHANICAL LOCKING CONNECTOR PARTS LIST 10 mechanical locking connector
10a upper mechanical locking connector
10b lower mechanical locking connector
14 configured tube
14a upper configured tube
14b lower configured tube
16 wedge receiver
18 wedge
20 actuator machine screw
22 body hole
24a–n interior planar sides
26a–n slots
30 planar top
32 planar panel
4 planar panel
36 keeper tab
38 keeper tab
40 channel
42 central body
44 keeper bar
46 keeper bar
48 angled surface
50 angled surface
54 channel
56 retainer
60 threaded hole
62 angled surface
64 angled surface
66 tapered surface
68 tapered surface
70 arrow
72 arrow
74 shelf or table
76 recess
78 bore
80 disk
82 disk extension
84 spacer washer
86 shouldered bore
90 caster
92 bracket
94 nut
96 washer
98 interfacing washer
100 central tube
102 threaded rod
104 stabilizing washer
106 retainer

What is claimed is:

1. A method of joining, the method comprising the steps of:
   a. providing a complementary receptor;
   b. providing a mechanical locking connector including:
      (1) a wedge, the wedge having a central body with opposing keeper bars, a top, opposing wedge-like angled surfaces extending downwardly and outwardly from the central body, and a threaded hole extending vertically;
      (2) a one-piece wedge receiver, the one-piece wedge receiver having a planar top with a downwardly facing lower surface, opposed outer regions and a centrally located body hole between the outer regions, the body hole extending vertically through the planar top, opposing flexible planar panels extending downwardly from the outer regions of the planar top, the planar panels including opposed inwardly facing surfaces, opposed inwardly facing keeper tabs below the opposed inwardly facing surfaces, outwardly facing tapered surfaces and inwardly facing angled surfaces, wherein the downwardly facing lower surface, the inwardly facing surfaces and the keeper tabs define a channel for accommodating a portion of the wedge including the central body and keeper bars of the wedge when the inwardly facing angled surfaces are in intimate and sliding contact with the opposing wedge-like angled surfaces of the wedge and restricting separation of the wedge from the wedge retainer; and,
      (3) an actuator extending through the body hole of the wedge receiver and threadingly engaging the threaded hole of the wedge;
   c. inserting the mechanical locking connector into an end of the complementary receptor; and,
   d. rotating the actuator to slide the wedge toward the top of the wedge receiver, thereby forcing the tapered surfaces of the planar panels into frictional engagement with the interior surfaces of the complementary receptor.

2. The method of claim 1, further comprising the step of attaching a component to be joined to the complementary receptor to the actuator adjacent the top of the wedge receiver.

3. The method of claim 1, further comprising the step of counter-rotating the actuator to allow the planar panels to release from the interior of the complementary receptor, thereby allowing reversibility of the joining.

4. The method of claim 1, wherein the mechanical locking connector further includes a central tube having a first end and a second end opposite the first end, said central tube connecting the mechanical locking connector to another mechanical locking connector, the another locking connector being identical to the mechanical locking connector and being mounted in mirrored fashion relative to the mechanical locking connector; and, the method further includes the steps of:
   a. inserting the another mechanical locking connector into an end of another complementary receptor; and,
   b. rotating the actuator relative to the wedge of the another mechanical locking connector so as to slide the wedge toward the top of the wedge receiver, thereby forcing the tapered surfaces of the planar panels into frictional engagement with the interior surfaces of the another complementary receptor.

5. A mechanical locking connector for internal engagement and connection within a complementary receptor, the mechanical locking connector comprising:
   a. a wedge, the wedge having a central body with a top, opposing keeper bars extending outwardly from the central body, a shallow channel on the top, opposing wedge-like angled surfaces extending downwardly and outwardly from the central body, and a threaded hole extending vertically through the central body;
   b. a one-piece wedge receiver, the one-piece wedge receiver having a planar top with a downwardly facing lower surface beneath the planar top, opposed outer regions, and a centrally located body hole between the outer regions, the body hole extending vertically through the planar top, opposing flexible planar panels extending downwardly from the outer regions of the planar top, the planar panels including opposed inwardly facing surfaces, opposed inwardly facing keeper tabs below the opposed inwardly facing surfaces, outwardly facing tapered surfaces and inwardly facing angled surfaces, wherein the downwardly facing lower surface, the inwardly facing surfaces and the keeper tabs define a channel for accommodating a portion of the wedge including the central body and keeper bars of the wedge when the inwardly facing angled surfaces are in intimate and sliding contact with the opposing wedge-like angled surfaces of the wedge and restricting separation of the wedge from the wedge receiver; and,
   c. an actuator extending through the body hole of the wedge receiver and threadingly engaging the threaded hole of the wedge, wherein rotation of the actuator forces the wedge to urge the planar panels outward, the outwardly facing tapered surfaces engage the interior of the complementary receptor.

6. The mechanical locking connector of claim 5, wherein a central tube having a first end and a second end opposite the first end, connects the mechanical locking connector to another mechanical locking connector, the another locking connector being identical to the mechanical locking connector and being mounted in mirrored fashion relative to the mechanical locking connector.

7. The mechanical locking connector of claim 6, wherein the mechanical locking connector and the another mechanical locking connector share an actuator.

8. The mechanical locking connector of claim 7, wherein the actuator is a threaded rod.

9. The mechanical locking connector of claim 6, wherein the central tube includes a stabilizing washer secured about a midsection of the central tube, the stabilizing washer arranged for interaction with the complementary receptor of the mechanical locking connector on a first side of the stabilizing washer and the complementary receptor of the another mechanical locking connector on a second side of the stabilizing washer.

10. The mechanical locking connector of claim 6, wherein the first end of the central tube is mounted to the top of the wedge receiver.

11. The mechanical locking connector of claim 10, wherein the second opposite end of the central tube is mounted to the top of the wedge receiver of the another mechanical locking connector.

12. The mechanical locking connector of claim 5, wherein the actuator is a machine screw.

13. The mechanical locking connector of claim 5, wherein the wedge has a lower channel and the actuator has a retainer located below the wedge in the lower channel.

14. The mechanical locking connector of claim 5, wherein the actuator secures a bracket carrying a castered wheel.

15. The mechanical locking connector of claim 5, wherein the actuator secures a disk and a disk extension of smaller diameter than the disk above the top of the wedge receiver, which disk and disk extension may be accommodate in a circular recess on a first side of a panel and a concentric bore extending through the panel, to allow a configured tube to be connected at a second side of the panel.

16. The mechanical locking connector of claim 15, wherein the panel is a shelf.

17. The mechanical locking connector of claim 15, wherein the panel is a desk.

18. The mechanical locking connector of claim 5, further comprising an extruded configured tube receptor, which extruded configured tube receptor accepts insertion of the mechanical locking connector in an unactuated state and retains the mechanical locking connector in an actuated state by forced and intimate contact and frictional engagement of the planar panels of the wedge receiver with interior sides of the extruded configured tube receptor.

* * * * *